United States Patent [19]

O'Hare

[11] 4,179,893
[45] Dec. 25, 1979

[54] SOLAR ENGINE CALLED, BELLOWS SOLAR ENGINE

[76] Inventor: Louis R. O'Hare, 1041 Ponderosa #2, Fort Collins, Colo. 80521

[21] Appl. No.: 814,283

[22] Filed: Jul. 11, 1977

[51] Int. Cl.² ............................................. F02C 1/04
[52] U.S. Cl. ..................................... 60/682; 60/508; 60/650
[58] Field of Search ................ 60/517, 641, 650, 682, 60/525, 522

[56] References Cited

U.S. PATENT DOCUMENTS

| | | | |
|---|---|---|---|
| 795,761 | 7/1905 | Fulton | 60/641 |
| 957,086 | 5/1910 | Pelletier | 60/641 X |
| 1,326,092 | 12/1919 | Pratt | 60/517 X |
| 1,926,463 | 9/1933 | Stoddard | 60/682 |
| 3,426,525 | 2/1969 | Rubin | 60/519 |
| 3,827,675 | 8/1974 | Schuman | 60/517 |
| 4,009,573 | 3/1977 | Satz | 60/519 |

FOREIGN PATENT DOCUMENTS

349931  7/1905  France ....................................... 60/682

Primary Examiner—Martin P. Schwadron
Assistant Examiner—Stephen F. Husar

[57] ABSTRACT

A reciprocating engine for water pumping or air circulation is disclosed which uses solar energy from a black box collector or other low temperature heat source to expand and contract bellows thereby providing large forces with low pressures by taking advantage of large working areas available with bellows. The engine is essentially a constant pressure, variable volume thermodynamic cycle engine having a compressor, a heater and a driver with the compressor and the driver sections both being bellows, the driver being capable of operating the compressor section by means of the former enjoying a force advantage or a mechanical advantage over the later.

5 Claims, 16 Drawing Figures

SOLAR ENGINE CALLED, BELLOWS SOLAR ENGINE

This invention is a type of constant pressure, variable volume thermodynamic cycle engine. It uses heat energy to expand gases in order to produce a force acting against a large area. The surface against which the force is applied moves under the influence of the force to provide useful work energy. The energy of this engine is provided principally in the form of a reciprocating action and is ideally suited for pumping water or for operating a bellows to move air in a solar heating instalation. In principle this engine is similar to thermodynamic cycle engines based on a constant pressure cycle. However, this present engine is specifically designed to operate at very low temperature differences of a few hundred degrees Fahrenheit. The principal object of this invention is to provide a heat engine capable of operation on air expanded by a black body solar collector such as a conventional black box collector. In respect to this objective this engine closely resembles the invention of my copending patent application called, "Black Box Collector Solar Engine" Ser. No. 791,862 filed Apr. 28, 1977. However, a distinctive object and characteristic of this present invention is the provision of an engine with the largest possible working area for the pressure to act against for the least financial expense. The moving element in this present engine, which element produces work when the force of gas pressure moves it a distance, is extraordinarily large in proportion to the cost required for its construction. To achieve the object of providing useful work energy with very low pressures derived from low temperatures, the low pressures must be applied over a very large area to derive significant force from the engine. Accordingly, this engine employs bellows as an inexpensive means of providing very large surface area against which large volumes of heated and expanding air from a solar collector box can operate. By way of an example if it were desired to provide mechanical work energy from a large, sealed solar collector of the black body absorber type, it could be noticed that as outside air was admitted to the box and then sealed therein, the pressure per square inch would elevate only a few pounds as the sun's energy heated the box a few hundred degrees above ambient temperature. However, since the area of the solar collector is usually considerable, the total force against the walls of the collector is very great. If the walls of the collector were not strong enough in their physical construction they would move outward. The measure of the linear outward movement would not be very great, but the total volume displacement would be great because of the areas involved. Very large diameter pistons with a very short stroke could take advantage of this high force—low movement energy that is available. The area of emphasis is that a large bellows would offer the advantage of doing it less expensively. This present invention then provides mechanisms and working principles whereby solar heated air or other gas produces useful mechanical energy by expanding against the walls of large bellows repeatedly, providing a reciprocating action. This engine is like other constant displacement engines in that volumes change by a constant amount with each cycle. This engine also resembles the gas turbine in that both utilize some of the input energy to provide compression energy to move air to an area where heat will expand it. However, this present invention of mine differs from the gas turbine in that turbines do not use constant displacement motors nor compressors and the turbines use combustion energy rather than solar heat to expand the volume and increase the force of the gas. In the present invention as heat from solar energy expands confined air or other gas, the expanding air produces two forces on two separate bellows. These bellows are of different sizes in one embodiment. In another embodiment one has a mechanical advantage over the other. When the two bellows are of different sizes and are both connected to the same pressure source, namely the sealed collector, the pressures within them are the same. However, since each of these two bellows are of different sizes and have different moveable areas of different dimensions, more force will be developed on the larger moveable area of the larger bellows. The bellows are placed together in such a way the the expansion of one opposes the expansion of the other. (For example in one embodiment each is placed on the opposite end of a lever from the other, both pressing upward against the lever arm.) The larger bellows having greater force moves the arm up to compress the smaller bellows thereby forcing the smaller bellows to exit its air into the collector where the air expands by heating to assist the expanding action of the larger bellows. When both bellows have reached the limit of their travel, valving allows exit of the expanded gas and another combination of large and small bellows are used to move the lever in the opposite direction. In the case of this second set of large and small bellows, the large bellows is on the opposite side of the large bellows in a first set and the small bellows of the second set is on the opposite side of the small bellows of the first set. When air is expanding in one set to inflate the large bellows of that set and to compress the small bellows of that set, valving prevents air from expanding under pressure in the opposite set. To state this in another way, just as it is possible to rock a lever arm up on one side and down on the other side of a fulcrum by having larger expanding bellows on the side being forced upward than the bellows on the side being forced downward when both bellows are receiving equal pressure, so too it is equally possible to rock the lever arm in the opposite direction by switching pressure from the first set of dissimilar sized bellows to another set of dissimilar bellows in which second set the larger bellows is on the opposite side of the fulcrum from the side having the first set's larger bellows.

Switching or transferring pressure from one set of bellows to the other set is accomplished by a selector valve which simultanously directs gas flow for pressure reduction in one set at the same time that it admits expanding gas or air into the opposite set. Repeated switching of the valving thereby provides repeated reciprocating action of the lever arm. In one embodiment an extension of the lever arm contacting a selector switch or valve just as the lever arm is reaching the limit of its movement operates the selector valve to reverse air flow for movement in the opposite direction. In one embodiment valving is used to provide flow for cooling for the gas in the set which is not at that time being heated and expanded.

In another embodiment valving merely provides exit for the heated and expanded air from the larger bellows of either set of bellows when that particular set has reached the outward limit of travel of its larger bellows at the same time the valving provides inlet of air to the smaller bellows from ambient air.

Further clarification of the basic mechanism and operating principle of this invention may be had by reference to the drawings.

Figure 1:
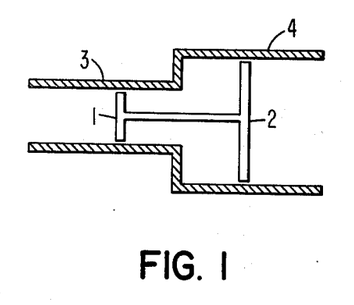
FIG. 1 of the drawings shows a system of pistons with equal pressures and absence of movement.

Referring then to FIG. 1 of the drawings, two pistons 1 and 2 in cylinders 3 and 4 are stable and at rest with all pressures on both sides of each piston being equal.

Figure 2:
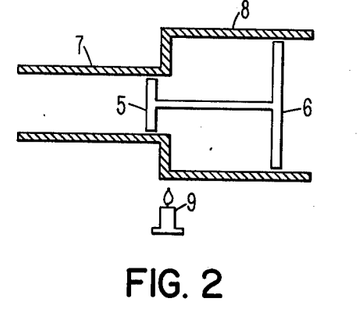
FIG. 2 of the drawings shows a system of equal internal pressure in which force moves the smaller piston in a direction against the pressure on it.

Referring then to FIG. 2 of the drawings, pistons 5 and 6 in cylinders 7 and 8 move because flame 9 provides heat to elevate pressure and produce greater force on 6, even though pressures on the inside are equal. The greater force on 6 is due to the larger area of 6 over which the pressure is applied.

Figure 3A:
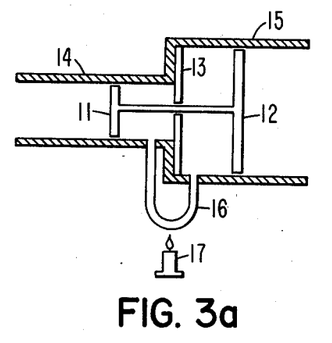
FIGS. 3a and 3b shows a compressor and a mover piston separated in different chambers and air heating done in a separate area.
Figure 3B:
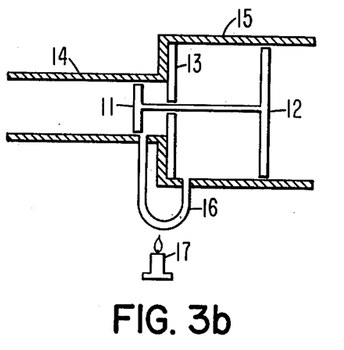

In FIG. 3 piston 11 of smaller area acts as a compressor or pump when moved by larger piston 12. Seal 13 provides a type of isolation between the two cylinders 14 and 15 so that heating may be done in heater tube 16 by flame heater 17. Heating elevates the pressure causing 12 to move outward and causing 11 to deliver additional air to the heating tube for further expansion when heated.

Figure 4A:
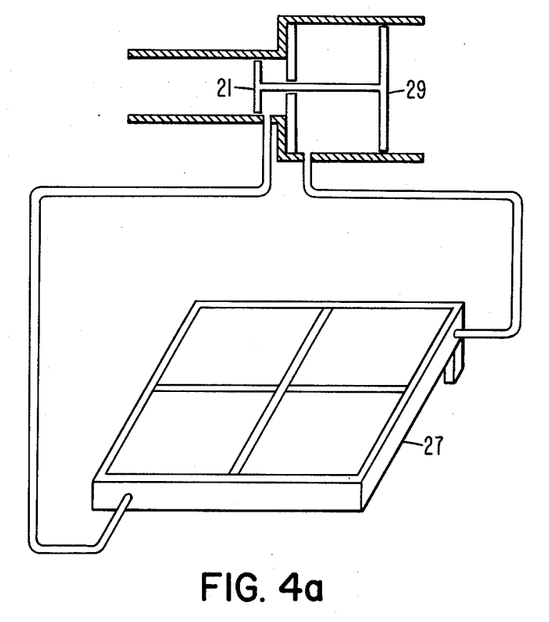
FIGS. 4a and 4b illustrates the thermodynamic action of the above pistons being achieved by a solar heater in place of a flame heater.
Figure 4B:
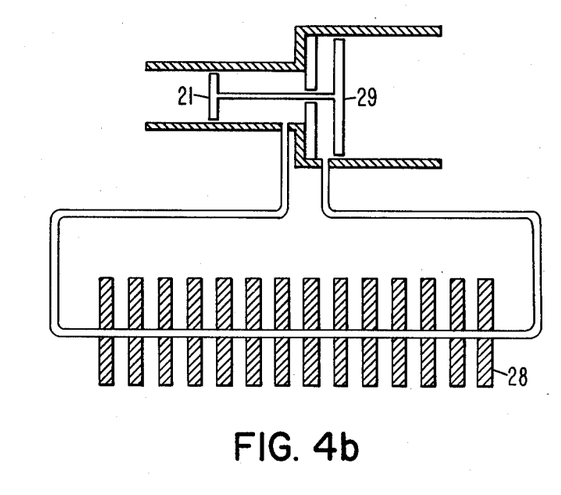

In FIG. 4a solar heater 27 substitutes for the heater tube and flame heater of FIG. 3. Solar heater 27 receives a quantity of air from compressing action of small piston 21. Then 27, by expanding the volume with heat, extends the area over which pressure may be applied and increases the force available from that quantity of air. In FIG. 4b cooler 28 moves large piston 29 in opposite direction that heater 27 would move it.

Figure 5:
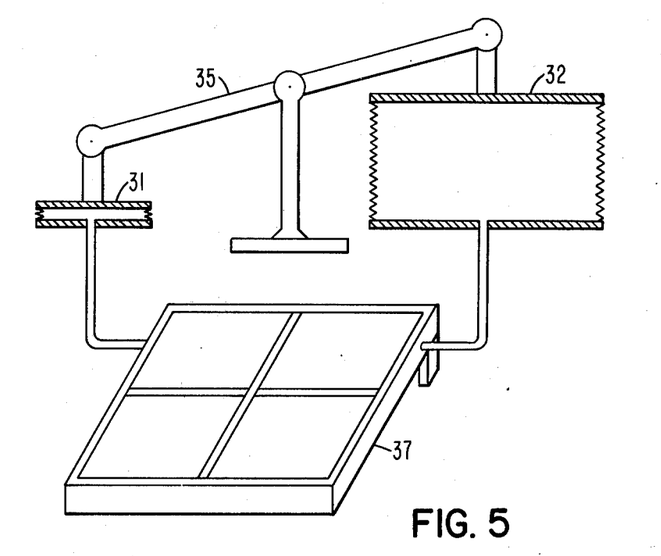
FIG. 5 of the drawings shows bellows replacing pistons to show an interaction between two opposing pressures which result in movement because of a force difference.

In FIG. 5 of the drawings, low-volume bellows (with its smaller area of moveable surface) functions as smaller piston 21 of FIG. 4 in that 31 of FIG. 5 is caused by the greater force of bellows 32, transmitted through lever arm 35, to move against its internal air pressure thereby pumping a quantity of air into solar heating box 37 for expansion and for force increase in larger bellows 32 to move lever 35.

Figure 6:
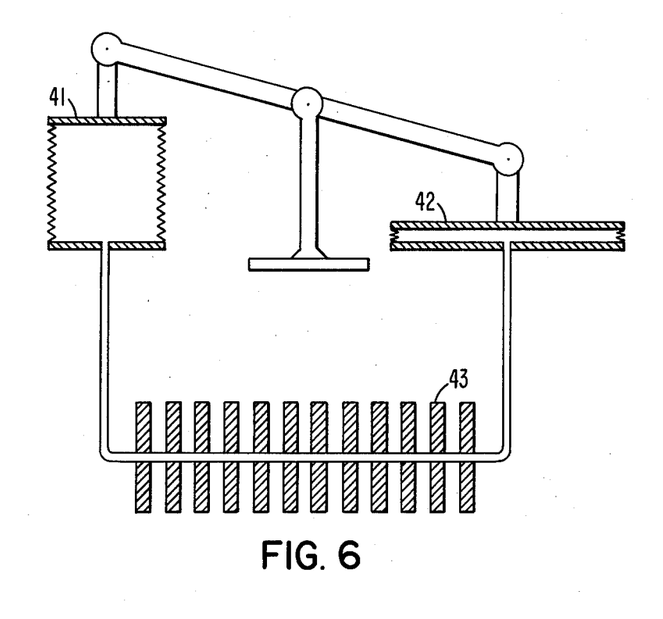
FIG. 6 illustrates movement produced by cooling.

In FIG. 6 where cooling produces a movement in a direction opposite to the heating direction, external pressures on the smaller bellows 41 are the same as the external pressures on larger bellows 42 but external forces are greater on the larger bellows collapsing it and moving its internal air into 41 through cooler 43 where the air contracts, decreasing in volume and pressure.

Figure 7:
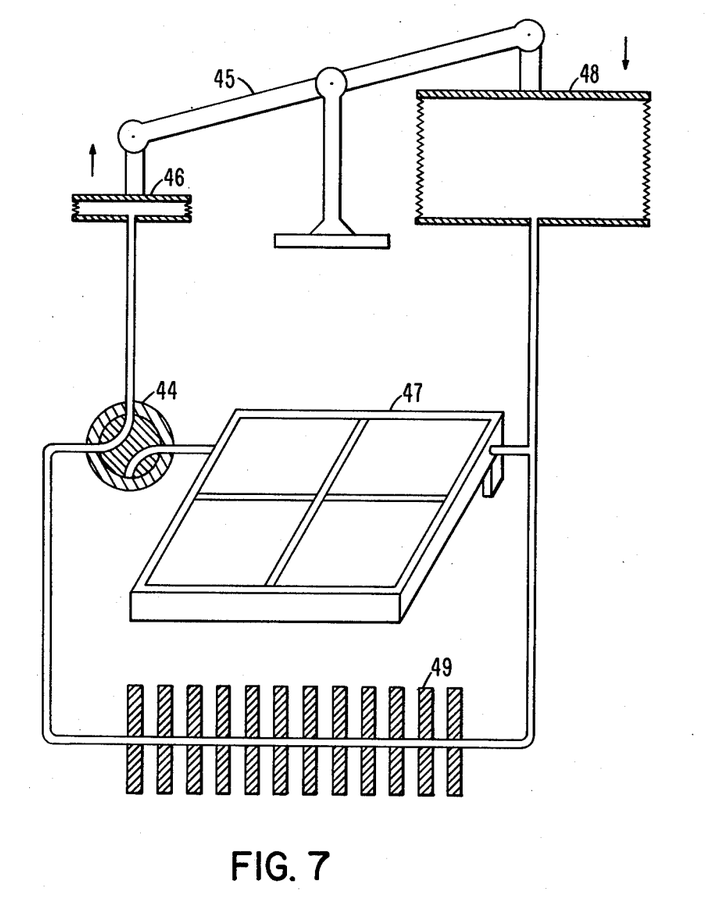
FIG. 7 illustrates how reciprocating movement is produced by alternately heating and cooling air.

Referring to FIG. 7 reciprocating action of lever 45 is caused by alternately heating and cooling air or other gas. The heating produces expansion of the air when solar collector 47 receives air from small bellows 46 and then exits hot expanded air into large bellows 48. The cooling is provided after the distributor valve 44 switches during the period of time just as the large expanding bellows is reaching the limit of its expansion travel. Distributor valve switching at that time opens cooler 49 to receive pressurized air from 48, cooling and contracting the air thereby contracting 48 to move cooled air to smaller bellows 47.

Figure 8:
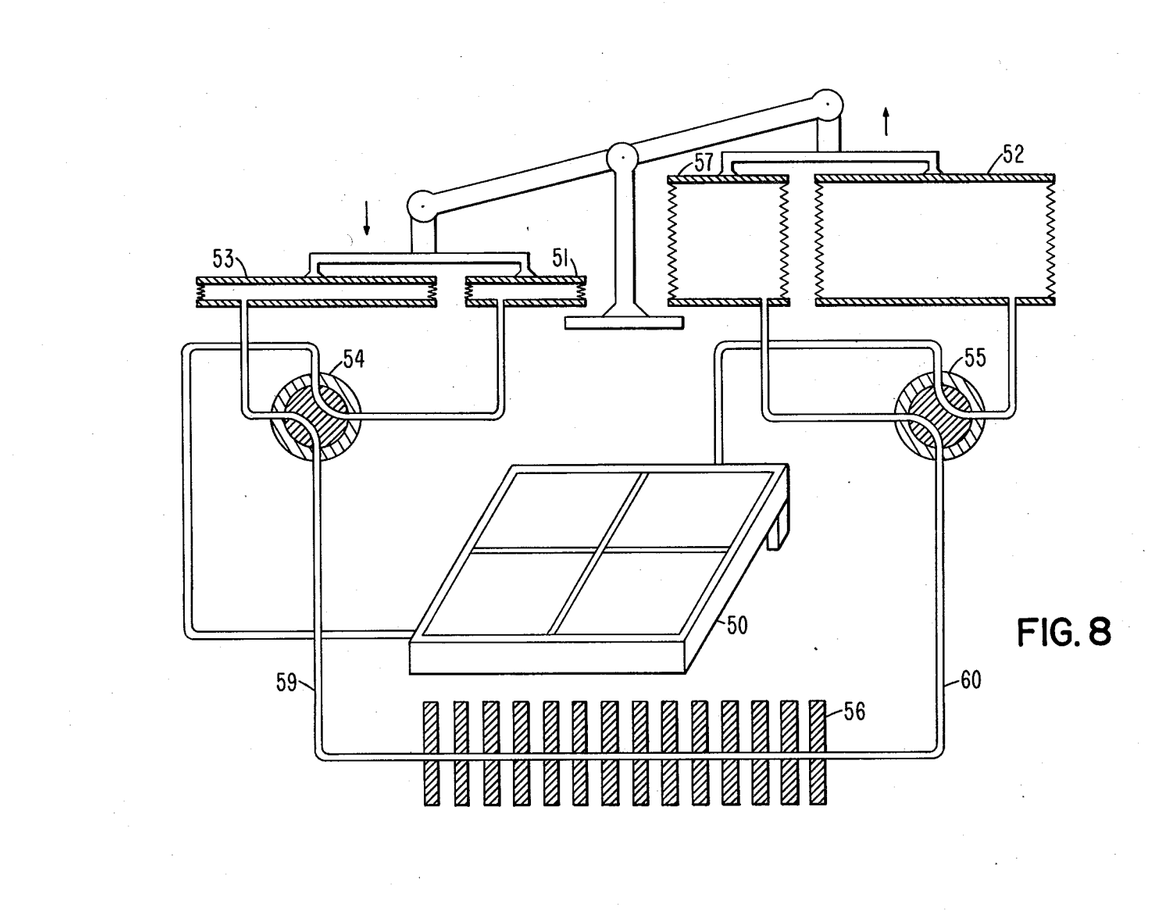
FIG. 8 shows the combination of two reciprocating mechanisms to provide positive reciprocating action.

In FIG. 8 two reciprocating mechanisms are combined with two distributor valves to provide a very positive reciprocating action. With the distributor valves 54 and 55 in their present position, solar heat energy from sealed collector 50 expands and compresses a volume of air from small bellows 51 and enlarges large bellows 52. Bellows 52 thereby causes 51 to contract and to pump air or gas to 50. The heat-caused expansion of 52 also constricts large bellows 53 by the action of lever arm 58 thereby causing 53 to deliver its air through distributor valves 54 and 55 to cooler 56 and to small bellows 57. By reducing the volume of quantity of air cooler 56 assists in the contraction of large bellows 53. However, cooler 56 is not absolutely essential and in some embodiments it is omitted. In the embodiments in which it is omitted duct 59 is used to exit air to the atmosphere or duct 59 is used to deliver the air from 53 to systems requireing a source of pressureized air as the circulating air system in a solar heated house. In embodiments in which cooler 56 is omitted duct 60 inlets ambient air to small bellows 57.

Figure 9:
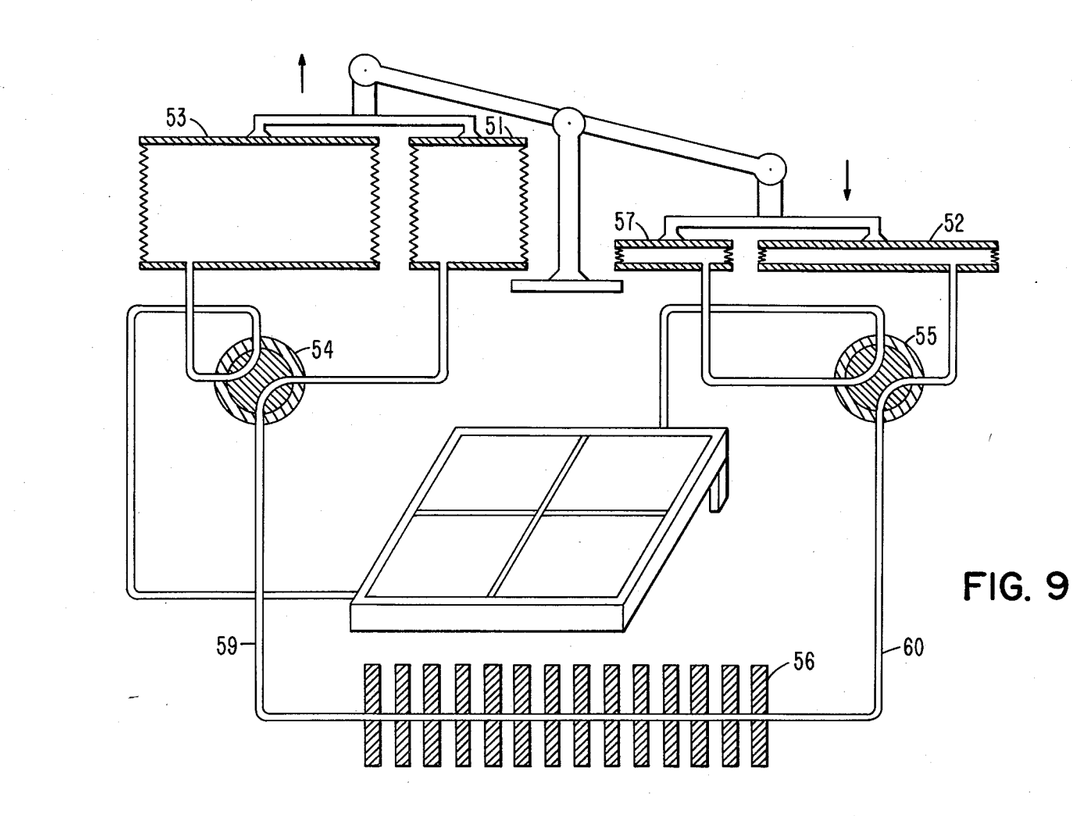
FIG. 9 shows movement in the opposite direction from FIG. 8 by means of a change in valve positioning.

In FIG. 9 then all of the components are the same as those of FIG. 8 except that the distributor valves 54 and 55 have been rotated to their alternate positions. Large bellows 53 has expanded since it has received hot expanded volumes of air from 50 thereby contracting 57 and also contracting large bellows 52. Bellows 52 also contracts by the volume reduction of its own air due to cooler 56 in those embodiments in which a cooler is employed. In embodiments in which a cooler is not employed and in which the engine is utilized to provide moving or pressurized air, bellows 52 is being made to contract and to expell air by the expansion of 53 and duct 60 is used as a means of delivering this source of air pressure. Duct 59 becomes the inlet duct at this period.

Since FIG. 8 and FIG. 9 each show a different alternate half cycle with the two alternate valve positions, one valve position change of each valve is necessary for each full cycle of reciprocation. The valves 54 and 55 are ganged so that they change position together. They may be rotary, spool, piston or poppet distributor valves. The distributor valves are operated by levering or gear actuators in various embodiments. Pneumatic, electric, hydraulic drive etc. may be used in other embodiments to actuate the distributor valves as is practiced in the distributor valve art. The internal positioning and direction of the valves is changed only in the final, last small percentage of the lever arm's total travel, i.e. just before the lever arm reaches the limit of its travel in either direction.

Figure 10:
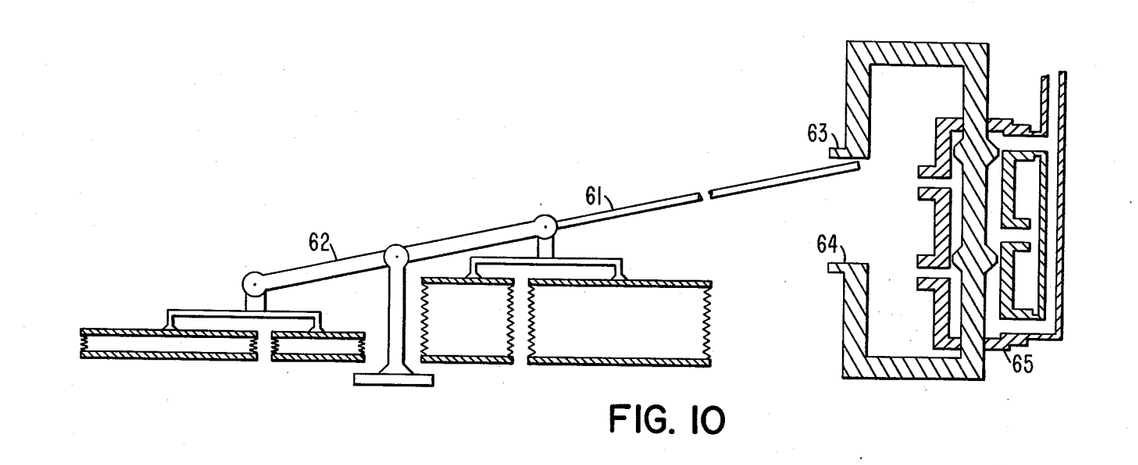
FIG. 10 shows a means of changing valve direction at the end of a stroke using a spool type four way selector valve.

FIG. 10 shows one way in which this is done. An extension arm 61 of the bellows lever 62 engages alternately contacts 63 and 64 near the final positions of its upward and downward stroke to change the position of four way spool type distributor valve 65. Two of these valves are used in the engine in this manner and they are ganged together. Only one is illustrated here for convenience.

Figure 11:
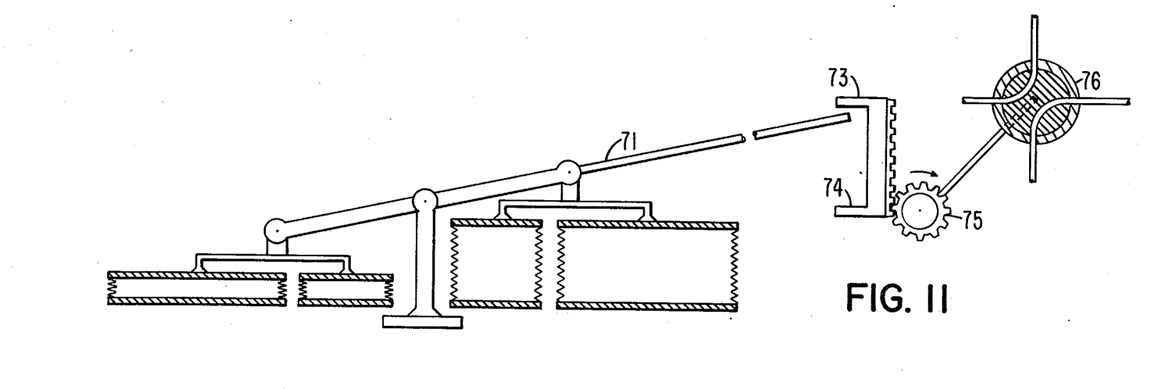
FIG. 11 shows a valving means using a rotary four way selector valve.

In FIG. 11 an extension arm 71 engages contacts 73 and 74 of rack and pinion 75 to rotate rotary distributor valve 76. Two of these valves are used but only one is shown for descriptive convenience since two are ganged together and rotate together.

Figure 12:
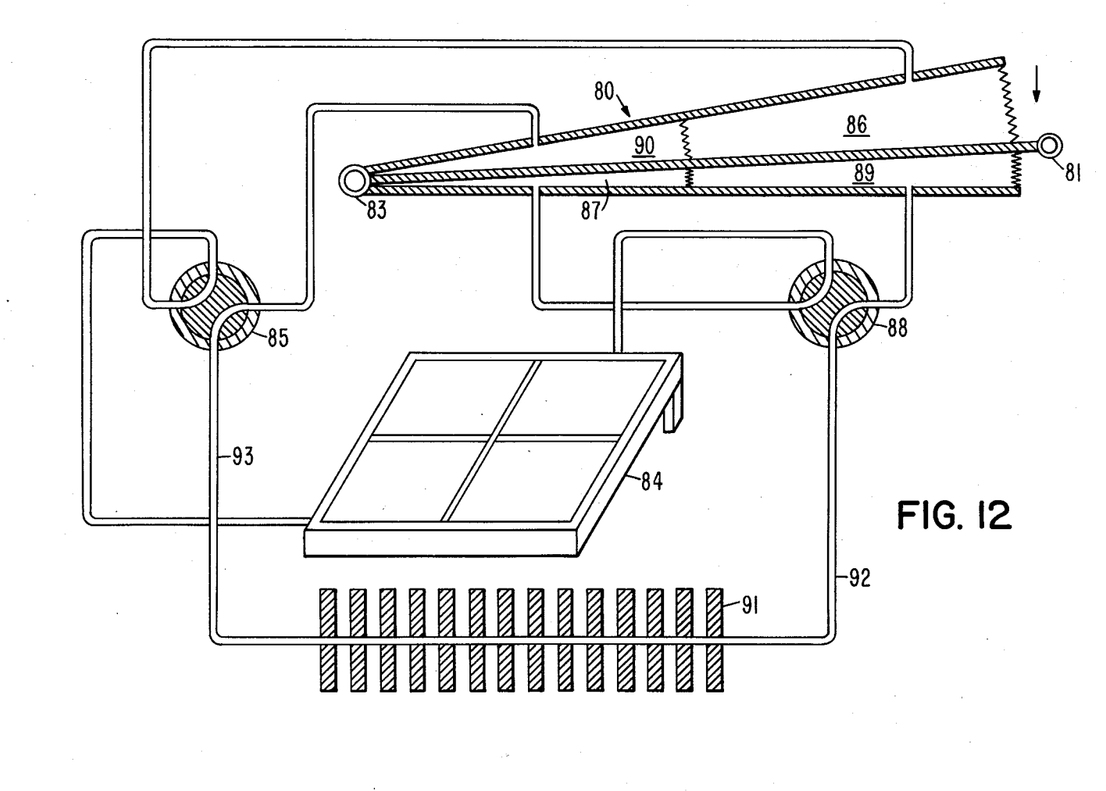
FIG. 12 shows a composite bellows, the center member of which reciprocates to provide reciprocating mechanical energy from solar heated air.

In FIG. 12 of the drawings a large composite bellows 80 is employed in place of four smaller bellows. Only the center rigid member arm 81 is moveable and it pivots about hinge 83. Air or other gas heating and expanding in sealed solar collector 84 moves through distributor valve 85 into large bellows chamber 86 expanding this chamber and moving arm 81 downward thereby compressing and expelling air from chamber 87 into collector 84 through distributor valve 88. (Chamber 86 has a mechanical advantage as well as a force advantage over chamber 87 when the pressures are the same within each.) In moving downward arm 81 expells air from bellows chamber 89 and draws air into bellows chamber 90. The air drawn into 90 during this half cycle is always through selector valve 85 and the air expelled from 89 during this half cycle is always through selector valve 88. In one embodiment the air exited from 89 through 88 moves through cooler 91, then through 85 to 90. In another embodiment cooler 91 is not used and air exited from 89 through 88 is used as an air pressure energy source to drive a supply of air through a solar heated house or to provide other pressurized air requirements. In another embodiment in which energy is extracted from arm 81, air from 89 during this half cycle is merely vented to the atmosphere through 92. Then air is inlet through 93 from the atmosphere.

During the opposite half cycle chamber 89 expands when 88 is rotated to admit hot air from 84 and when simultaneously 85 is rotated to transmit air from collapsing 90 to collector 84 where it is heated to expand 89. At that time air is expelled from 86 through 85 and 93 in one embodiment or in another embodiment it is then directed through 91 for contraction and delivery to 87. In one embodiment in which 93 and 92 are vented to the atmosphere and 91 is not used, energy is available for work only at reciprocating arm 81. Cooler 91 is used as an option to provide additional energy at arm 81. Cooler 81 is also used in an embodiment where it is desired to maintain a closed cycle, as is the case when gases other than air are used. For instance nitrogen dioxide or other light-absorbing gases are used in a closed cycle system for better solar absorbtion in the solar collector.

In another embodiment 92 and 93 with their repeated exiting and inletting functioning are connected to a bridge type check valve system to provide a one direction outlet air supply and a one direction inlet.

Figure 13:
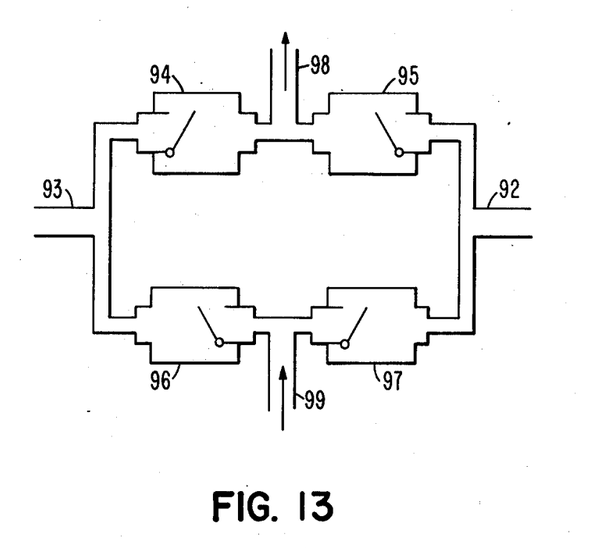
FIG. 13 shows a bridge type check valve system for removing useful air pressure.

In FIG. 13 the check valves 94, 95, 96, and 97 are arranged in a bridge network to receive alternating pressure and vacuum from ducts 93 and 92 and to convert these alternations to outward pressure at duct 98 and vacuum pressure at duct 99. This network may be placed in the position of the cooler in the embodiments of this invention using lever arm and fulcrum action whenever it is desired to receive compressed air energy from the engine.

Figure 14:
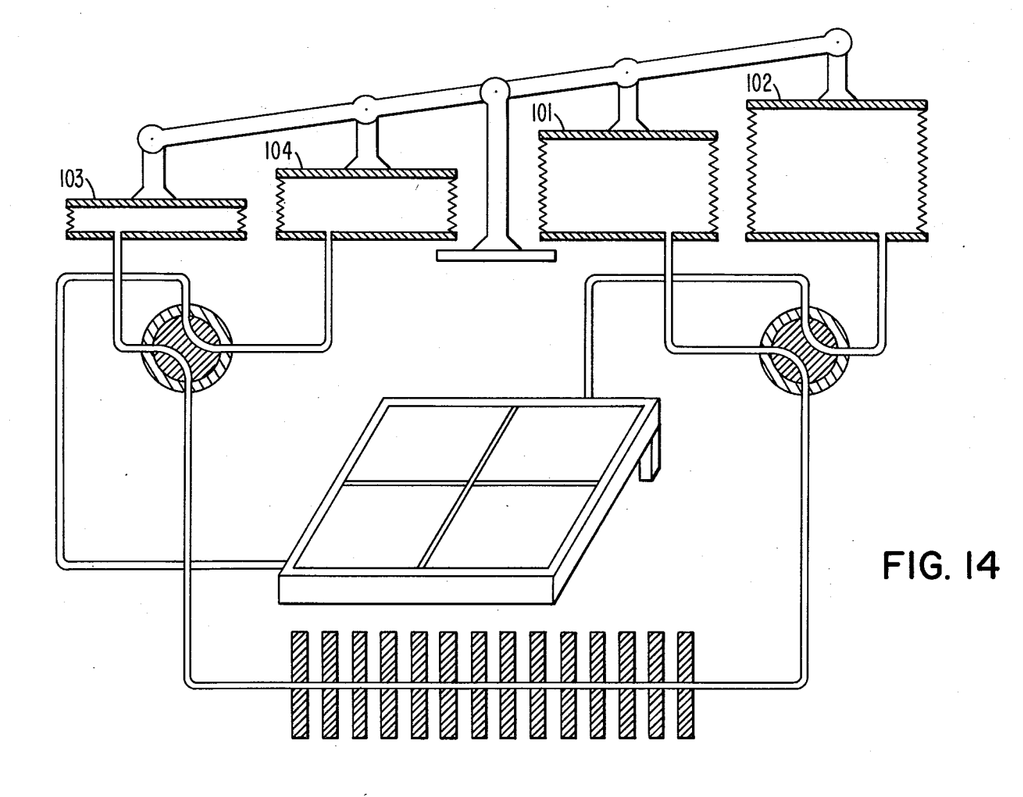
FIG. 14 shows bellows operating by mechanical rather than force advantage.

In FIG. 14 driving bellows 101 and 102 are able to compress driven compressor bellows 103 and 104 even though there is no force advantage of the former over the latter because the areas of all are the same. However, the outermost bellows, 101 and 102, have a mechanical advantage which enables them to compress 103 and 104.

This engine is primarily for the purpose of solar energy conversion to mechanical energy and its reciprocating action suits it for operating reciprocating water pumps etc. Other heat sources may be used in place of the solar collector. It will operate using a sealed heat sink placed in a geothermal heat source etc.

I claim:

1. A constant pressure, variable volume thermodynamic cycle engine comprising:
   (1) sealed and gas tight cooling means provided with inlet and outlet pressure tight ducting and,
   (2) sealed and gas tight gas heating means provided with inlet and outlet pressure tight ducting and,
   (3) gas pressure and gas force to mechanical energy conversion means in the form of sealed bellows capable of expansion and contraction by the respective filling and removal of heat pressurized gas such as air and,
   (4) gas pressure distribution means providing alternately one then another set of routings of gas pressure, one of said set of routings providing a flow passage between a large expanding bellows connected to a lever on one side of a fulcrum and a smaller bellows connected to the lever arm on the opposite side of the fulcrum said gas flow passage having the gas heater means in the center of the gas flow between the large expanding bellows and the small contracting bellows, and the other routing of the first set of routings providing a gas flow communication between a smaller expanding bellows on the same side of the fulcrum as the large expanding bellows with a large contracting bellows on the opposite side of the fulcrum said flow communication thereby being routed through a cooling means in an intermediate position between said bellows, the second and alternate set of routings being provided by the alternate positioning of the gas distribution means providing for an exchange in the flow circuitry when the large expanding bellows has reached its maximum expansion, said exchange in the flow circuitry connecting said cooling means intermediate in the flow series between said expanded bellows and its opposite smaller bellows on the opposite side of the fulcrum, and the second routing of this alternate set providing a gas flow communication connecting heating means in the flow circuitry intermediate in series flow between the smaller expanded bellows (on the same side as the larger expanded bellows) and the large contracted bellows on the opposite side of the fulcrum, said alternations of the gas distribution means thereby providing separate flow channels between an expanded large bellows, a cooling means, and a small contracted bellows on the opposite side of the fulcrum on one hand and a channel between a small expanded bellows, said heating means and a large contracted bellows on the opposite side of the fulcrum and, (5) mechanical energy directing means in the form of a lever pivoting on a fulcrum directing the energy of the expanding bellows on a first side of a pivot to compress bellows on the other, second side of the pivot and subsequently directing the energy of an expanding bellows on that second side of the pivot to compress a bellows on the first side, the reciprocating action of said lever thereby providing a means of extracting useful work energy.

2. An engine as in claim 1 in which the energy directing means is a lever pivoting on a hinge in a confined area, said lever having the hinge at one end acting as its fulcrum and said lever being capable of moving to a limited degree in either direction to the effect that when forced by an expanding bellows to move in one direction it will compress bellows on its opposite side and subsequently when forced by another expanding bellows on that opposite side it will move to compress a bellows on the first side, thereby providing a reciprocating lever arm oscillating back and forth within a confined area from which reciprocating mechanical energy may be extracted.

3. An engine as in claim 1 in which the gas heating means is a sealed heat exchanger capable of being heated by geothermal heat.

4. A constant pressure, variable volume thermodynamic cycle engine comprising:
   (1) gas force to mechanical energy conversion means comprising large sealed bellows capable of operating at very low gas pressures, said bellows being capable of expansion and contraction by the respective filling and removal of heat pressurized gas such as air and,
   (2) sealed and gas tight heating means provided with inlet and outlet pressure tight ducting and,
   (3) sealed and gas tight cooling means provided with inlet and outlet pressure tight ducting and,
   (4) gas pressure distribution means providing first one then another set of routings of gas pressure, said routings being between two sets of elements containing two bellows each, the bellows of each set being mechanically connected to the other bellows of its set in such a way that the expansion of one bellows causes the contraction of the other bellows and said bellows further so disposed by mechanical interconnection that one bellows from each set expands as the opposite bellows of that set contracts, said gas distribution means first providing interconnecting gas flow passage between the first set of opposed bellows in such a manner that the gas passage channel is from one expanding bellows to its opposite contracting bellows through gas cooling means, and said distribution means also first providing another interconnecting passage between the second set of bellows in such a manner that the gas passage channel is from one to another bellows of the second set of opposed bellows so that, in the second set, the gas passage channel interconnects one expanding and one contracting bellows through said heating means, said gas pressure distribution means alternately in its second positioning providing an alternate gas flow passage between the first set of bellows in such a manner that said gas flow passage is from one contracting bellows to its opposite expanding bellows through said heating means while at the same time in this second positioning said distribution means also providing another interconnecting passage between the second set of bellows in such a manner that the flow passage is from one contracting to another opposite expanding bellows through said cooling means, (5) mechanical energy directing means capable of directing the energy of the expanding bellows to the bellows capable of compressing and pumping gas, said energy directing means also being capable of providing reciprocating energy output from expanding-contracting bellows.

5. An engine as in claim 4 in which the gas heating means is a sealed solar energy collector such as a black box solar collector.

* * * * *